United States Patent [19]

LaBianco

[11] Patent Number: 5,031,260
[45] Date of Patent: Jul. 16, 1991

[54] FLUID-FILLED MATTRESS CONSTRUCTION

[76] Inventor: Richard LaBianco, 3430 W. Carriage Dr., Santa Ana, Calif. 92704

[21] Appl. No.: 484,182

[22] Filed: Feb. 23, 1990

[51] Int. Cl.⁵ .............................................. A47C 27/08
[52] U.S. Cl. ................................................. 5/457; 5/451
[58] Field of Search .................. 5/457, 458, 449, 450, 5/451, 441, 452, 455

[56] References Cited

U.S. PATENT DOCUMENTS

| | | | |
|---|---|---|---|
| 691,118 | 1/1902 | Curlin | 5/457 |
| 1,823,569 | 9/1931 | Mellano | 5/457 |
| 3,848,282 | 11/1974 | Viesturs | 5/457 |
| 4,045,830 | 9/1977 | Loeb et al. | 5/81 R |
| 4,371,999 | 2/1983 | Reid | 5/457 |
| 4,825,485 | 5/1989 | Chiou | 5/457 |
| 4,908,895 | 3/1990 | Walker | 5/457 |

FOREIGN PATENT DOCUMENTS 331459 7/1958 Fed. Rep. of Germany .......... 5/457
1121162 7/1956 France ...................................... 5/457

*Primary Examiner*—Alexander Grosz
*Attorney, Agent, or Firm*—Fulwider Patton Lee & Utecht

[57] ABSTRACT

A fluid-filled mattress construction having an outer cover separated by a plurality of vertically extending generally I-beam shaped ribs. The ribs include a vertical web and upper and lower horizontal flaps. The midportion of the flaps are formed with a bead. When the walls of the cover are compressed against the ribs during the fabrication operation, the bead ensures a positive bonding of the cover walls to the rib flaps and reduces the potential degradation of or separation of the cover from the ribs.

6 Claims, 3 Drawing Sheets

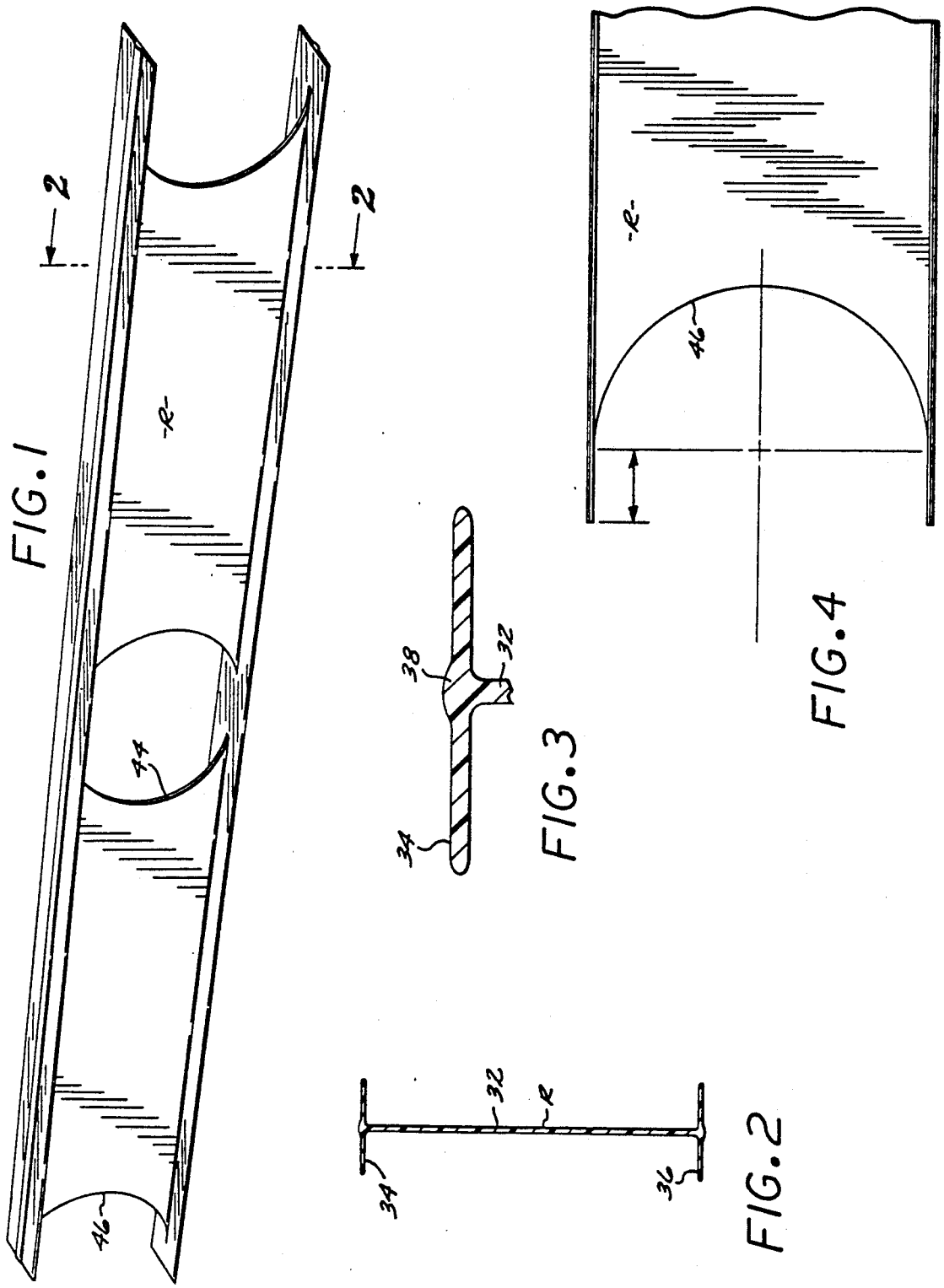

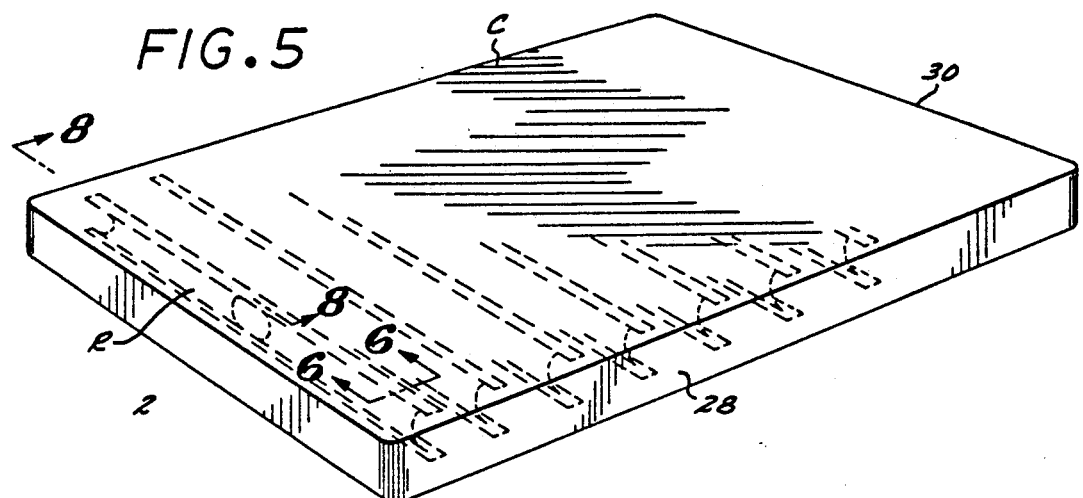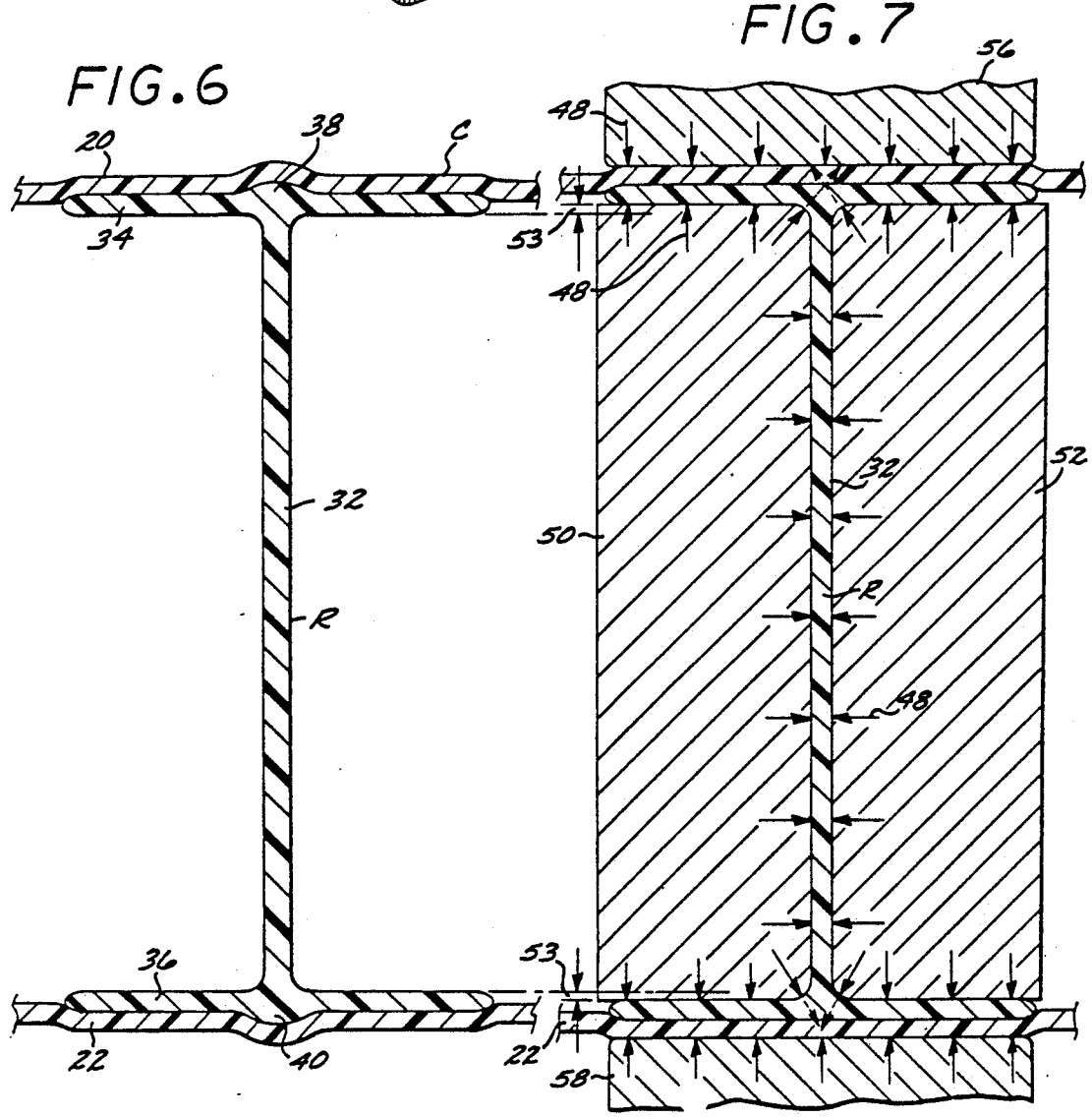

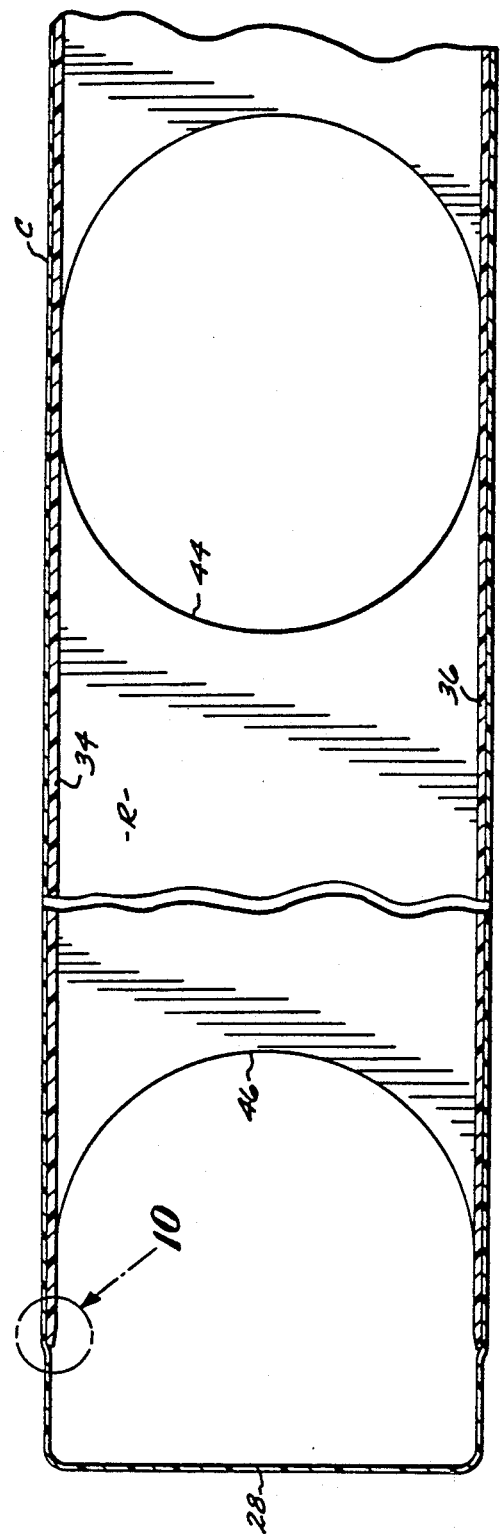
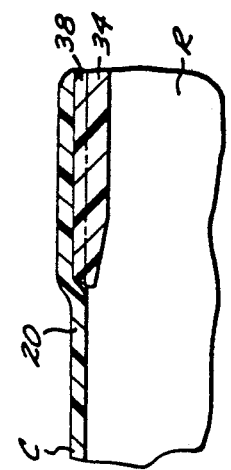
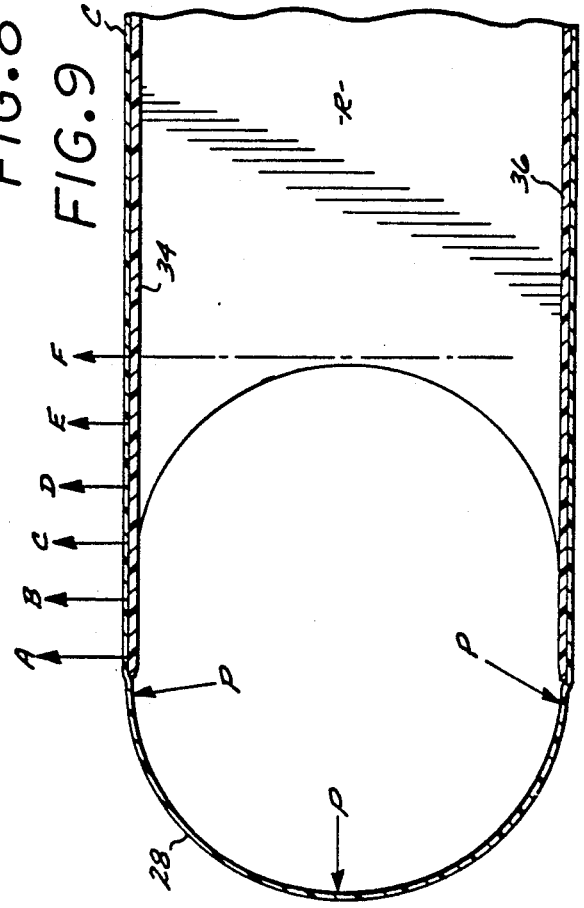

FLUID-FILLED MATTRESS CONSTRUCTION

BACKGROUND OF THE INVENTION

Fluid-filled mattresses have been used for many years. Such mattresses generally comprise an outer cover having upper and lower walls connected at their peripheral portions by side and end walls, and with a plurality of vertically extending ribs interposed between the upper and lower walls of the cover. The cover is sealed and contains either air, water or a mixture thereof. In most cases, the cover and ribs are formed of a synthetic plastic material. The upper and lower ends of the ribs are attached to the interior of the upper and lower walls of the cover by dielectric heating to form a bond. It is necessary to heat the bead to a high temperature to obtain a bond. As a result the cover material is degraded. Because of such degradation, the cover material often pulls away from the ribs. It has also been proposed to form horizontal flaps on the upper and lower ends of the ribs and to adhere such flaps to the upper and lower surfaces of the cover, as by dielectric heating. With this construction it is very difficult to adhere the center portion of the ribs to the cover material. Accordingly, failure of the connection between the rib and the cover material can occur.

Failure of the attachment of the ribs to the cover also frequently occurs at the connection between the outer ends of the ribs and the cover. Such failure results from the high stress which occurs at these connection points because the ends of the ribs cannot stretch in a vertical plane.

SUMMARY OF THE INVENTION

The fluid-filled mattress construction of the present invention utilizes a cover member and a plurality of vertically extending ribs interposed between the upper and lower walls of the cover. The upper and lower ends of the ribs are formed with integral horizontally extending flaps that extend horizontally outwardly from the vertical web of the ribs. Such flaps differ from prior ribs of this type in that an integral bead extends vertically from the mid-portions of the flaps in alignment with the vertical web of each rib. The flaps of the ribs are adhered to the interior surfaces of the upper and lower cover walls by tools which are interposed on opposite sides of the flaps and the cover walls to concurrently apply dielectric heating and compressive pressure to the flaps and cover walls. During this procedure the flap beads are tightly compressed into the cover material so as to form a complete bond in the vicinity of the bead.

Another feature of the present invention resides in forming the opposite ends of each rib with an arcuate cut-out that extends towards the vertical center-line of the rib. This arrangement permits the upper and lower walls of the side portions of the cover to be capable of vertical flexure and expansion without rupturing the connection between the ends of the ribs and the cover material at their point of engagement of the ribs to the interior surfaces of the cover.

BRIEF DESCRIPTION OF THE DRAWINGS

Other objects and many of the attendant advantages of the present invention will be readily appreciated by reference to the following detailed description, when taken in conjunction with the accompanying drawings in which like-referenced numerals designate like parts throughout the figures thereof:

FIG. 1 is a perspective view of a rib utilized in the fluid-filled mattress construction of the present invention;

FIG. 2 is a vertical sectional view taken in enlarged scale along line 2—2 of FIG. 1;

FIG. 3 is a broken fragmentary view showing the top portion of the rib of FIGS. 1 and 2;

FIG. 4 is an enlarged elevational view of one end of the rib shown in FIGS. 1, 2 and 3;

FIG. 5 is a perspective view of a fluid-filled mattress construction embodying the present invention;

FIG. 6 is a vertical sectional view taken in enlarged scale along lines 6—6 of FIG. 5 and showing the interrelationship between a rib and the upper and lower cover walls before such members are adhered together;

FIG. 7 is a view similar to FIG. 6 showing the rib and cover material of FIG. 6 being bonded together;

FIG. 8 is a vertical sectional view taken in enlarged scale along line 8—8 of FIG. 5;

FIG. 9 is a broken view similar to FIG. 8 but showing one side of the mattress as it undergoes expansion under pressure; and FIG. 10 is an enlarged view of the encircled area designated 10 in FIG. 8.

DETAILED DESCRIPTION OF A PREFERRED EMBODIMENT

In the accompanying drawings there is shown in FIG. 5 a perspective view of a fluid-filled mattress construction embodying the present invention. Such mattress includes a cover member C having upper and lower walls 20 and 22, respectively. A plurality of generally I-beam shaped ribs R are interposed between the upper and lower walls 22 and 22 of cover C. The upper and lower cover walls are connected at their peripheral portions by side and end walls 28 and 30, respectively, in a conventional manner. The cover C is fluid-tight and may be provided with means for admitting and removing fluid from the interior of the cover. Such means are well-known to those skilled in the art and are not shown in the drawings. Preferably, the cover C and ribs R are formed of a synthetic plastic material which can be rigidly joined together, as by dielectric heating or gluing. Alternatively, the cover and ribs may be formed of other types of flexible fluid-tight and adhesible material, such as a rubberized fabric.

More particularly, where cover C is formed of a flexible synthetic plastic material, plastics such as PVC or polyurethane commonly used in fabricating air and water bed mattresses may be utilized. The dimensions of such cover may be chosen to meet the needs of various purchasers. The cover may be conveniently be formed of complementary upper and lower sheets of material which are integrally bonded around their peripheries in a conventional manner so as to define the upper and lower walls 20 and 22 and the side and end walls 28 and 30.

Ribs R are also formed of a synthetic plastic material which preferably may be bonded to the synthetic plastic material of the cover C by dielectric heating in a conventional manner. Each rib R includes a vertical web 32 and upper and lower flaps 34 and 36, respectively, which are integrally formed with the web 32. A raised bead 38 extends upwardly from the mid-portion of upper flap 34 in vertical alignment with web 32. A similar raised bead 40 depends from the mid-portion of lower flap 36 in vertical alignment with web 32. Preferably, such beads 38 and 40 are integral with their flaps 34 and 36. As indicated in FIG. 1, a fluid transfer aperture 44 is formed in the web 32 of each rib R. Such aperture effects transfer of air between the spaces separating the ribs R in an air mattress. Where the mattress is utilized in a waterbed, such apertures permit air burping as the bed is filled with liquid. Although a single aperture 44 is shown, it should be understood that a plurality of such apertures may be utilized. Referring again to FIG. 1, it will be observed that both ends of rib R are formed with an arcuate cut-out 46 that is curved away from the outer ends of the rib towards the vertical center line of the rib and hence of the mattress.

The method of joining the ribs R to cover C is shown in FIGS. 6 and 7. Referring thereto, each rib R is positioned vertically between the upper and lower walls 20 and 22 of the cover as indicated in FIG. 6. In FIG. 7, left and right interior heating bars 50 and 52 are inserted between the upper and lower flaps 34 and 36 on either side of web 32 and in close engagement with the web and the flaps. Preferably, the interior heating bars are slightly taller than the relaxed rib web 32 and extend horizontally over the flaps 34 and 36. Thus, as indicated at 53 in FIG. 7, the rib web is stretched vertically by the bars 50 and 52. As further indicated in FIG. 7, upper and lower heating bars 54 and 56 are positioned above the flap areas of the rib R. These upper and lower heating bars are urged towards the interior heating bars 50 and 52 under pressure while the interior heating bars 50 and 52 are urged towards one another, as indicated by the directional arrows 48. Concurrently, dielectric heating is applied by the bars to the flaps and the cover walls 20 and 22. The concurrent application of heat and pressure serves to bond the interior surfaces of the cover walls 20 and 22 to the upper and lower surfaces, respectively, of the upper and lower flaps 34 and 36. It should be particularly noted that the vertical pressure applied by the upper and lower heating bars 54 and 56 to the cover walls 20 and 22 in vertical alignment with the upper and lower rib flaps serves to depress the cover wall material into very tight compressive engagement with the rib beads so as to ensure a rigid and permanent inter-connection of the cover walls to the mid-portions of the ribs. Such a tight engagement could not be obtained in the absence of the rib beads since compression could not be directly applied against the upper and lower cover walls in vertical alignment with the rib web 32. After all of the ribs have been adhered to the upper and lower cover walls, the exterior heating bars 54 and 56 will be retracted, and the interior heating bars 50 and 52 will be withdrawn from within the confines of the cover. The periphery of the cover will then be sealed in a conventional manner.

Referring now to FIGS. 8, 9 and 10, the arcuate cut-out 46 formed at both ends of each rib R serves to resist failure of the attachment of the ends of each rib to the sides of the upper and lower cover walls 20 and 22. FIG. 9 shows how an end wall 28 will bulge outwardly, as would occur if a person jumped onto the fluid-filled mattress. FIG. 10 particularly shows that the outer end of rib flap 34 extends generally horizontally relative to the upper cover wall 20 outwardly of the outer end of cut-out 46. If these cut-outs 46 were not provided and the mattress was exceptionally pressurized in the manner shown in FIG. 9, the bond between the end portions of the rib flaps and the adjacent portions of the cover walls would be subjected to considerable stress. Such stress could readily cause the joint between the upper end of the rib and the cover to fail to pull through the cover wall. Thus, with particular reference to FIG. 9, should the end of rib R extend all the way to the edge of such rib, upon the imposition of excessive pressure to the interior of the fluid-filled cover C, the force F applied to the upper cover wall would be directly transmitted along the rib edge to the bottom cover wall 22. The maximum amount of force would be exerted directly along the plane of the rib edge, at the point indicated by the arrow A in FIG. 9. The magnitude of the force tending to separate the bond between the rib flaps and the upper cover wall is reduced towards the vertical center line of the rib as indicated by the arrows B, C, D and E in FIG. 9. Since, however, the rib R of the present invention is formed with the arcuate cut-out 46, any upward expansion of the upper cover wall 20 results in upper flexure of both the rib flap and the cover wall independently of the main body of the rib. This arrangement reduces the magnitude of force tending to separate the rib flaps and the upper and lower cover walls so as to reduce the likelihood of fracturing of the bond therebetween.

From the foregoing description, it will be seen that a fluid-filled mattress construction embodying the present invention will meet all the requirements of a conventional mattress construction of this type and in addition will afford maximum resistance against damage resulting from inadvertent separation of the ribs from the cover.

Various modifications and changes may be made with respect to the foregoing detailed description without departing from the spirit of the present invention.

I claim:
1. A fluid-filled mattress, comprising;
   a cover member which includes upper and lower walls connected at their peripheral portions by side and end walls;
   a plurality of generally I-beam shaped ribs interposed between the upper and lower walls of the cover, each of the ribs having a vertical web and upper and lower flaps integral with the upper and lower ends of the vertical web;
   an integral bead extending vertically away from the mid-portions of the flaps in alignment with the vertical web of each rib; and
   said cover and ribs being formed of a flexible fluid-tight, adhesible material, with the points of engagement of said flaps and beads with the cover being adhered together by the application of vertical pressure to the upper and lower cover walls, such pressure depressing the material of the cover walls into tight compressive engagement with the beads of each rib flap.
2. A fluid-filled mattress as set forth in claim 1 wherein said material is a synthetic plastic.
3. A fluid-filled mattress as set forth in claim 2, wherein the flaps and cover walls are adhered together by dielectric heating.
4. A fluid-filled mattress as set forth in claim 1 wherein the ends of each rib are formed with an arcuate cut-out that extends towards the vertical center-line of the rib to permit upper flexure of the rib ends and the adjacent cover walls independently of the main body of the rib.
5. A fluid-filled mattress as set forth in claim 4 wherein the flaps and cover walls are formed of a synthetic plastic material.
6. A fluid-filled mattress as set forth in claim 5 wherein the flaps and cover walls are adhered together by dielectric heating.

* * * * *